(12) United States Patent
Movshovich et al.

(10) Patent No.: US 8,285,040 B1
(45) Date of Patent: Oct. 9, 2012

(54) METHOD AND APPARATUS FOR ADAPTIVE CONTRAST ENHANCEMENT OF IMAGE DATA

(75) Inventors: Aleksandr Movshovich, Santa Clara, CA (US); Katherine Kuan, Sunnyvale, CA (US); Oscar Ayzenberg, Cupertino, CA (US)

(73) Assignee: CSR Technology Inc., Sunnyvale, CA (US)

( * ) Notice: Subject to any disclaimer, the term of this patent is extended or adjusted under 35 U.S.C. 154(b) by 504 days.

(21) Appl. No.: 12/572,040

(22) Filed: Oct. 1, 2009

Related U.S. Application Data (60) Provisional application No. 61/121,094, filed on Dec. 9, 2008.

(51) Int. Cl.
*G06K 9/00* (2006.01)
(52) U.S. Cl. ......... 382/167; 382/170; 382/254; 382/274
(58) Field of Classification Search .................. 382/100, 382/167, 170, 254, 263, 274, 286; 340/630; 356/438
See application file for complete search history.

(56) References Cited

U.S. PATENT DOCUMENTS

| | | | |
|---|---|---|---|
| 5,717,422 A | 2/1998 | Fergason | |
| 5,862,254 A | 1/1999 | Kim et al. | |
| 5,900,732 A | 5/1999 | Felmlee et al. | |
| 6,816,141 B1 | 11/2004 | Fergason | |
| 6,873,742 B2 | 3/2005 | Schu | |
| 7,003,153 B1 | 2/2006 | Kerofsky | |
| 7,034,843 B2 | 4/2006 | Nair et al. | |
| 7,042,522 B2 | 5/2006 | Kim | |
| 7,113,648 B1 | 9/2006 | Aihara | |
| 7,127,123 B2 | 10/2006 | Wredenhagen et al. | |
| 7,218,763 B2 | 5/2007 | Belykh et al. | |
| 7,221,408 B2 | 5/2007 | Kim | |
| 7,352,347 B2 | 4/2008 | Fergason | |
| 7,454,078 B2 | 11/2008 | Ramamurthy | |
| 7,505,604 B2 * | 3/2009 | Zakrzewski et al. | 382/100 |
| 7,729,510 B2 * | 6/2010 | Zakrzewski et al. | 382/100 |
| 2006/0013503 A1 | 1/2006 | Kim | |
| 2007/0071345 A1 | 3/2007 | Wang | |
| 2008/0037897 A1 | 2/2008 | Chiang et al. | |
| 2008/0123952 A1 | 5/2008 | Parkkinen et al. | |
| 2008/0170798 A1 | 7/2008 | Jia et al. | |
| 2008/0247665 A1 | 10/2008 | Hsu | |
| 2008/0310714 A1 | 12/2008 | Stern et al. | |

FOREIGN PATENT DOCUMENTS

JP      02007336531 A  * 12/2007

* cited by examiner

*Primary Examiner* — Anh Hong Do
(74) *Attorney, Agent, or Firm* — Lando & Anastasi, LLP (57) ABSTRACT

Adaptive contrast enhancement of image data is provided. In one embodiment a method for adaptive contrast enhancement includes receiving image data for a first frame, determining a pixel distribution for at least one color space component of the first frame based on luminance values of the pixels in the at least one color space and calculating an average picture level in the at least one color space based on the pixel distribution. The method additionally includes adjusting a look-up table (LUT) associated with the pixel distribution based on the average picture level, converting luminance values of the pixels in the first frame in the at least one color space based on the LUT to generate an enhanced image frame and outputting the enhanced image frame.

26 Claims, 6 Drawing Sheets

METHOD AND APPARATUS FOR ADAPTIVE CONTRAST ENHANCEMENT OF IMAGE DATA

CROSS-REFERENCE TO RELATED APPLICATION

This application claims the benefit of U.S. Provisional Application No. 61/121,094, filed on Dec. 9, 2008, which is hereby fully incorporated by reference.

FIELD OF THE INVENTION

The present invention relates in general to image and video processing and more particularly to adaptive contrast enhancement of image data.

BACKGROUND OF THE INVENTION

In the display arts, image contrast can affect the perceived dynamic range of displayed image data. Increasing or decreasing the contrast settings can present image data to be more or less visually stimulating. Un-adapted or uncorrected image signals can hide details of the image. Conventional approaches of adjusting contrast settings of a display device may employ an overall contrast setting, such as a brightness control, for complete adjustment of image data to be displayed. These adjustments however, may be too severe and can result in washout of the image.

Attempts have been made to modify the conventional approaches through adaptive contrast adjustment of image data. However, these attempts for adjusting the contrast can result in negative effects. For example, some contrast adjustment methods and devices create visual artifacts in enhanced image. Similarly, these adjustment methods can result in data cut-off in dark in bright pixel levels, degradation of dark scenes due to improper adjustment and even flickering. Additionally, performing contrast adjustment for color spaces may result in difficulty of maintaining a white balance due to non-linear gamma correction. Further, the cost of contrast adjustment in additional color spaces and accuracy of multiple conversions may be prohibitive.

Thus, there is a need in the art for an apparatus and methods of adaptive contrast which provides adaptive contrast of image data while increasing the dynamic range.

BRIEF SUMMARY OF THE INVENTION

Disclosed and claimed herein, are systems and methods for adaptive contrast enhancement of image data. In one embodiment, a method includes receiving image data for a first frame, determining a pixel distribution for at least one color space component of the first frame based on luminance values of the pixels in the at least one color space, and calculating an average picture level in the at least one color space based on the pixel distribution. The method further includes adjusting a look-up table (LUT) associated with the pixel distribution based on the average picture level, converting luminance values of the pixels in the first frame in the at least one color space based on the LUT to generate an enhanced image frame and outputting the enhanced image frame.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

One aspect of the present invention relates to adaptive contrast enhancement of image data. As disclosed herein, a method and apparatus are provided for conversion of luminance levels in at least one color space of an input signal and/or image data. In one embodiment, an average picture level of a pixel distribution may be determined for adjusting luminance values of pixel data. Utilization of an average picture level can provide additional headroom to represent very dark and/or bright images. In another embodiment, adaptive contrast may include adjusting a look-up table (LUT) curve associated with the pixel distribution. As such, adaptive contrast of the image data may be performed while preserving image details. Curve adjustment may also avoid noise amplification in dark regions of the image.

In yet another embodiment, pixel distribution values may be determined for detection of a scene change and updating of a LUT for conversion of pixel values. In that fashion, adaptive contrast enhancement of image data may be performed to provide contrast revealing details which may otherwise be hidden if the image were displayed. Further, the methods and apparatus as disclosed herein may allow for limited correction to avoid generating visual artifacts or affecting the image content.

DESCRIPTION OF THE EXEMPLARY EMBODIMENTS

Figure 1:
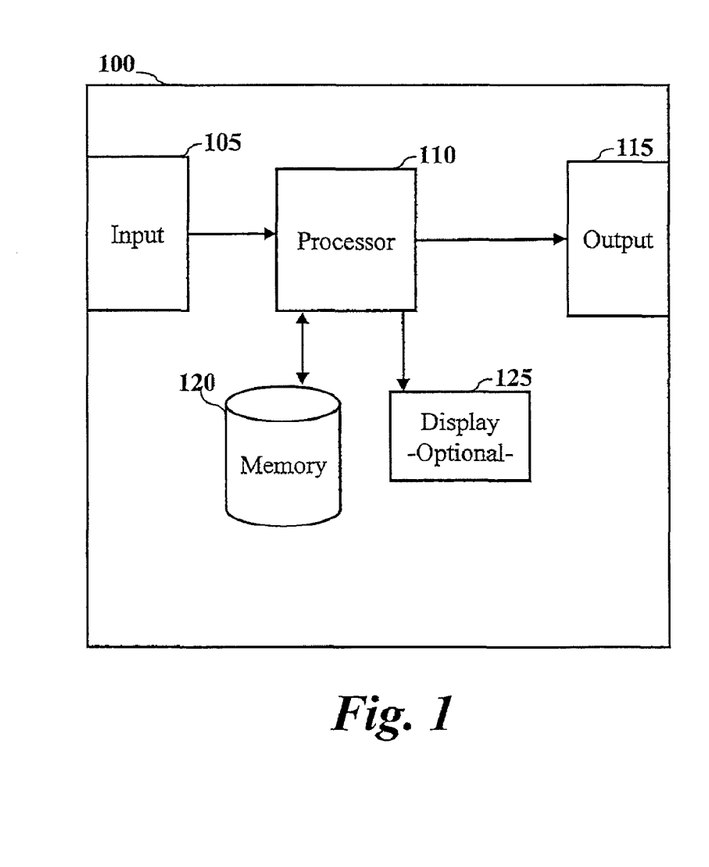
FIG. 1 depicts a simplified block diagram of a device for adaptive contrast enhancement according to one or more embodiments of the invention.

FIG. 1 depicts a simplified block diagram of a device for adaptive contrast enhancement according to one or more embodiments of the invention. Adaptive contrast device 100 includes processor 110 coupled to input terminal 105 and output terminal 115. Processor 110 may be configured to receive image data received by terminal 105 as input. Exemplary input to the system includes, but is not limited to quarter video graphics array (QVGA), encoded image and/or movie data (e.g., YUV422) and compressed images (e.g., Y-only downscaled copies). Processor 110 may be configured to process image data for output to a device via terminal 115 and/or storage on memory 120. In certain embodiments where device 100 relates to a display device, image data maybe processed by processor 110 for display by optional display 125. According to another embodiment, processor 110 may be configured to operate based on one or more instructions stored in memory 120, wherein memory 120 relates to one of ROM and RAM memory. Executable instructions and/or data received by device 100 may be stored by memory 120.

According to one embodiment, processor 110 may be configured to perform an adaptive contrast enhancement of received and/or stored image data. For example, processor 110 may convert one or more luminance levels of an input signal based on a LUT. Processor 110 may determine the LUT based on image data received for one or more frames to generate an image frame having enhanced contrast. In one embodiment, enhanced contrast may reveal details which may otherwise be hidden in an unprocessed image signal. Accordingly, image signals and/or data received on input 105 may be processed and output with an enhanced dynamic range. According to another embodiment, processor 110 may be configured to process a plurality of frames of the image signals/data received. As used herein, a frame may relate to image data captured by an imaging device, such as a photosensor, camera, video detector, etc. A frame may also relate to image data for a particular period of time. Although described as units of hardware in FIG. 1, it should be appreciated that the functions of the units may be implemented in a variety of ways including hardware, firmware, software, and combinations thereof.

Figure 2:
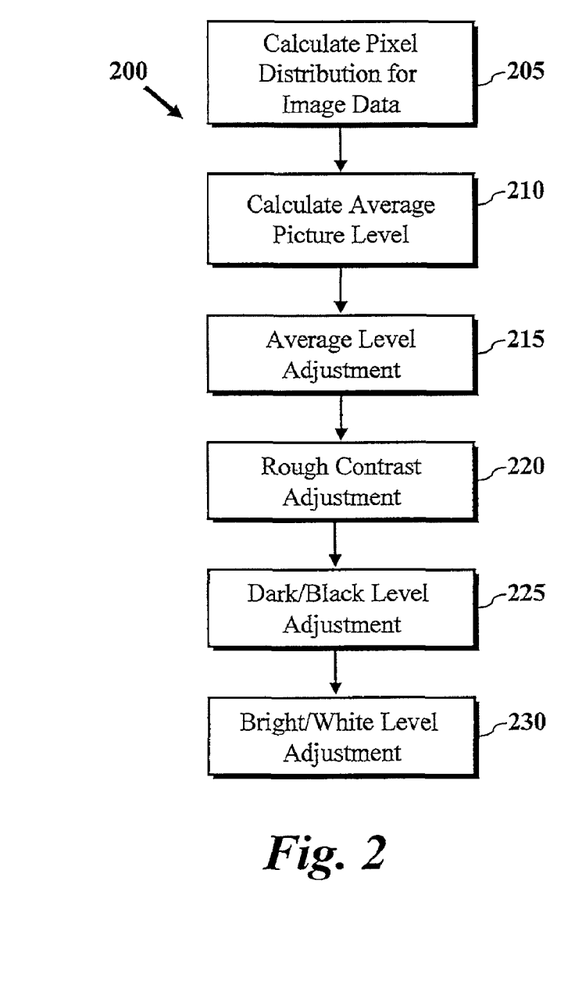
FIG. 2 depicts a process for adaptive contrast according to one embodiment of the invention.

Referring now to FIG. 2, a process is depicted for adaptive contrast according to one embodiment of the invention. Process 200 may be performed to define a LUT for conversion of image data (e.g., pixels) by the adaptive contrast device of FIG. 1. According to one or more embodiments of the invention, process 200 may be initiated by calculating a pixel distribution for image data at block 205. As will be described in more detail below with respect to FIG. 3, intensity values of pixels of the image may be grouped and/or binned. Accordingly, the pixel distribution may relate to a histogram calculation of pixel data. A processor may perform one or more adjustments of the pixel distribution for enhancement of the image data. At block 210, an average picture level (APL) may be calculated by a processor (e.g., processor 110) for the pixel distribution. At block 215, the processor can adjust the pixel, distribution and/or perform an average level adjustment (ALA) based on the determined APL to balance the distribution of pixels with respect to a midpoint of the pixel distribution.

In one embodiment, the adjusted pixel distribution may be utilized to calculate a LUT curve which may be employed to determine values of a LUT. At block 220, a rough contrast adjustment may be performed on the LUT curve to improve utilization of an adaptive range of output by changing the contrast of the image data. As will be discussed in more detail with respect to FIG. 5B below, the slope of the LUT curve may be modified to be centered on a detected APL level. The processor may additionally perform a dark/black level adjustment at block 225 and bright/white level adjustment at block 230 to modify luminance of the image pixels within one or more color spaces of the image frame. Image pixels which are darker and brighter may be modified to preserve image details and avoid amplification in dark and/or bright areas. Based on one or more of the aforementioned modifications of a pixel distribution in process 200, the processor may determine a LUT for the conversion of pixels and adaptive contrast of image data.

Figure 3:
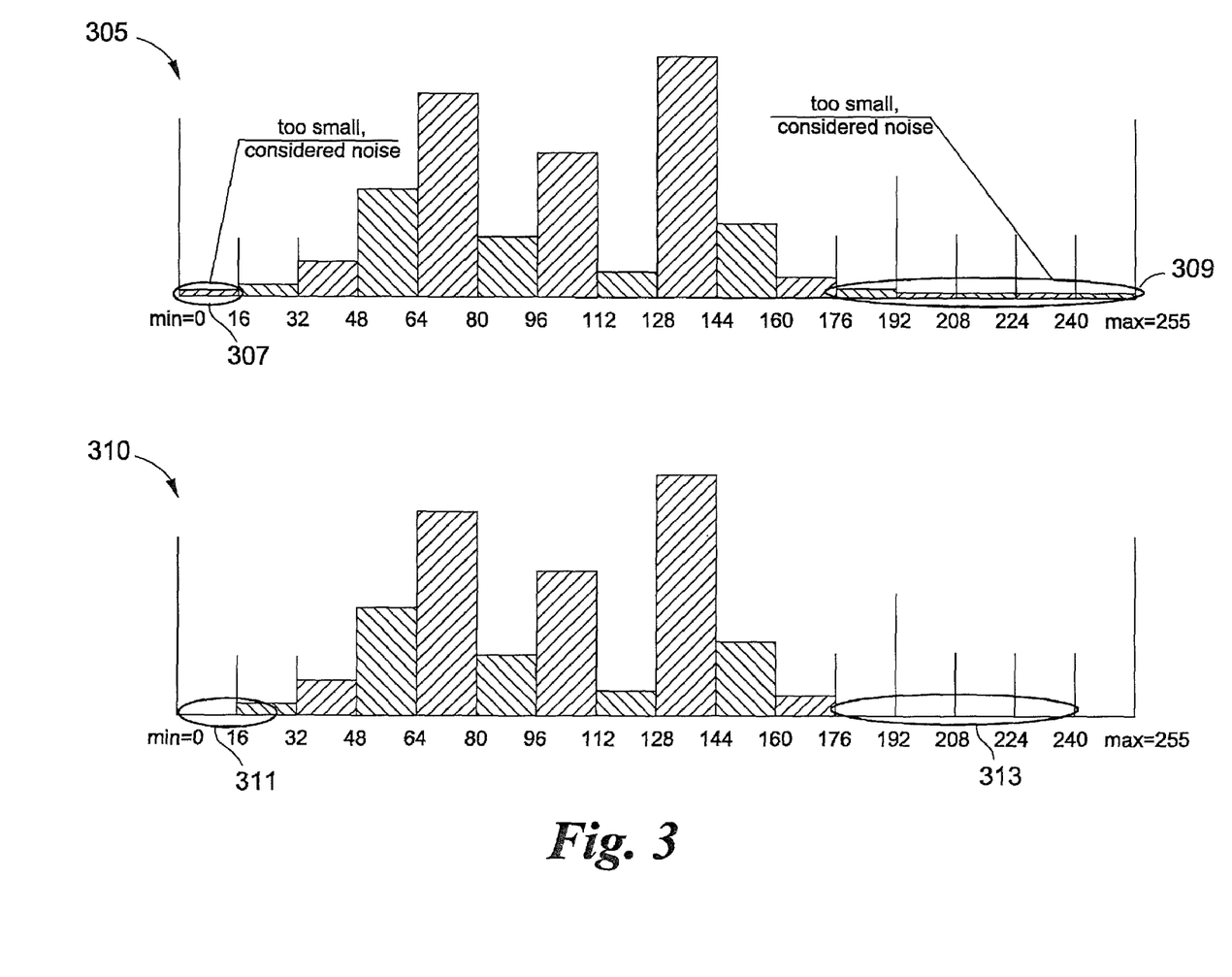
FIG. 3 depicts a graphical representation of pixel distributions according to one embodiment of the invention.

FIG. 3 depicts a graphical representation of a pixel distributions according to one embodiment of the invention. As shown in FIG. 3, pixel distribution 305 relates to histogram binning of pixel intensity values. According to one embodiment, pixel distribution 305 bins or groups luminance values of at least one color space. For processing of color images, adaptive contrast according to the invention may not be limited to the luminance component of a received signal as omitting chrominance can affect color saturation. Accordingly, adaptive contrast adjustment as used herein can include proportional adjustment of all components of a color space, (e.g., "R", "G", and "B" in a RGB color space) or any other means of compensation for changed saturation (e.g., linear chroma adjustment in general). According to one embodiment, when a histogram calculation is performed in RGB color space the histogram module must use the maximum of R, G, and B components (i.e. max(R,G,B)). According to another embodiment, histogram calculation by the processor can utilize 16 equally spaced fixed bins to build a histogram (regardless of the color space it operates in). The processor may be configured to allow for programmable width of the bins. In exemplary embodiments, the processor may be configured as an 8-bit system, the width of each bin set to 16 lsb (least significant bit). Similarly, the processor may be configured as a 10-bit system, the width of each bin set to 64 lsb.

According to one embodiment, the processor may be configured to remove noise related signal incursions reflected in the pixel distribution. As shown in FIG. 3, region 307 and region 309 relate to the bottom and top 2-4% of pixels, respectively, in an image. A processor of the adaptive contrast device may be configured to disregard the bottom and top pixels of pixel distribution 305 resulting in pixel distribution 310. Pixel regions 311 and 313 refer to pixel regions of pixel distribution 310 which do not include pixel values due to the cutoff.

Figure 4:
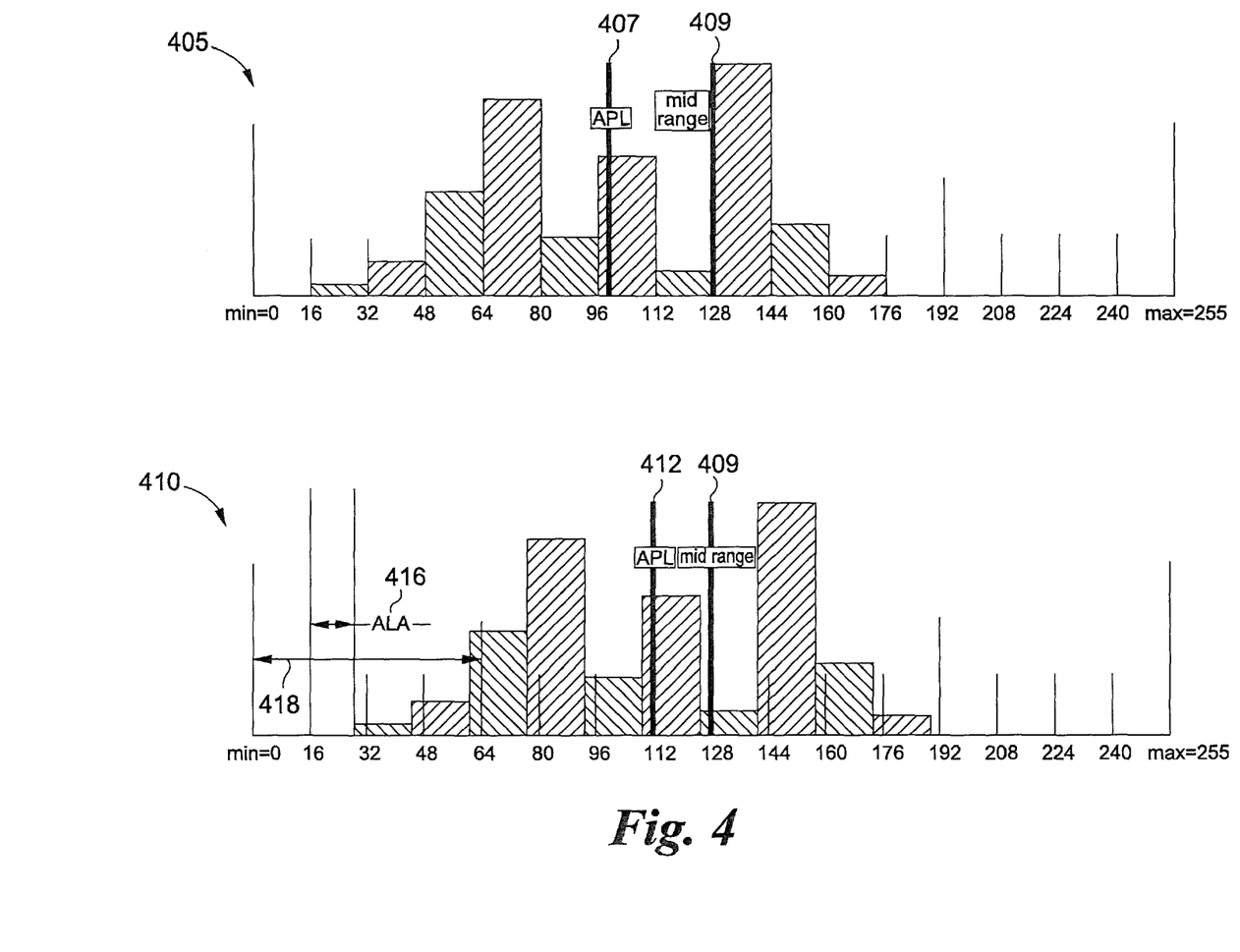
FIG. 4 depicts a graphical representation of pixel distributions according to one embodiment of the invention.

Referring now to FIG. 4, a graphical representation is depicted of pixel distributions for determining an average picture level calculation according to one embodiment of the invention. Adaptive contrast enhancement may utilize an average picture level calculation for modification of image brightness. A processor may receive a corrected pixel distribution 405 (e.g., pixel distribution 310) to calculate average picture level (AFL) 407 and midpoint 409. In one embodiment, the APL may be calculated as:

$$APL = \frac{\sum_{i=0}^{15} [(16 * i + 8) * \text{bin}(i)]}{\sum_{i=0}^{15} \text{bin}(i)};$$

Where bin (i) is the number of pixels accumulated in bin "i". For an evenly distributed frame, where each bin contains close to identical number of pixels, the calculated value of APL may be close to the midpoint number of (e.g., bin "128" in FIG. 4). Images which are skewed towards bright or dark side will have their APL value offset from the middle of the range number.

According to another embodiment, bins of the pixel distribution may not be equally spaced. For example, bins in dark and bright areas of pixel distribution may be sized smaller in relation to other bins of the pixel distribution to allow for increased resolution. When bins of the pixel distribution are not equally spaced, APL may be calculated in one embodiment as:

$$APL = \frac{\sum_{i=0}^{15} \left( \frac{\text{lower\_boundary}(i) + \text{higher\_boundary}(i)}{2} \times \text{bin}(i) \right)}{\sum_{i=0}^{15} \text{bin}(i)}$$

According to another embodiment, calculation of APL 407 may not be intended as a measure of picture brightness, rather it may be employed as a rough composite indication where the majority of image pixels are located (e.g., brightness vs. darkness) and how far they are from midpoint 409. Calculation of APL 407 can provide important data for initial image adjustment according to one embodiment. By way of example, the processor may be configured to perform an average level adjustment (ALA) to balance the pixel distribution with respect to a midpoint. As shown in FIG. 4, an ALA may be performed on pixel distribution 405 which results in pixel distribution 410. ALA 416 shifts APL 407 of pixel distribution 405 closer to midpoint 409 resulting in pixel distribution 410 having an APL 412.

According to another embodiment, calculation of ALA 416 may be defined by:

$$ALA = K_{ALA} * (128 - APL);$$

where $K_{ALA}$ is a coefficient which is set to define how aggressive the ALA should perform. $K_{ALA}$ may range from 0.0 to 1.0, wherein when $K_{ALA}=0.0$ corresponds to no brightness adjustment due to APL changes, and $K_{ALA}=1.0$ will always make APL level after adjustment exactly equal to the signal mid-range. In practice, an exemplary $K_{ALA}=0.5$ or slightly below, may be recommended to optimize system performance. Coring and/or a hysteresis function may be applied determinations of ALA to minimize ALA changes for minor adjustments.

According to another embodiment, calculation of an ALA level can define an adaptive contrast offset of the luminance at the output of an adaptive contrast module (e.g., device 100). In another embodiment, average level adjustments made by the processor should not be made instantly or in large steps. Of particular importance, it should not be affected by minor image changes. For example, any movements on the foreground should have very minimal impact, if any, on the image background. Hence only major changes of the histogram should trigger visible average level adjustments. ALA should not be performed instantly as it might cause undesired flickering of either foreground or background brightness. In order to slowdown adjustment process the measured APL value is filtered in an infinite impulse response (IIR) filter which guarantees the filter time constant to exceed 5-10 seconds. In an exemplary embodiment, 5-10 seconds time constant corresponds to 300-600 fields and can be easily implemented as a first order IIR with feedback coefficient k=997/1000.

Figure 6A:
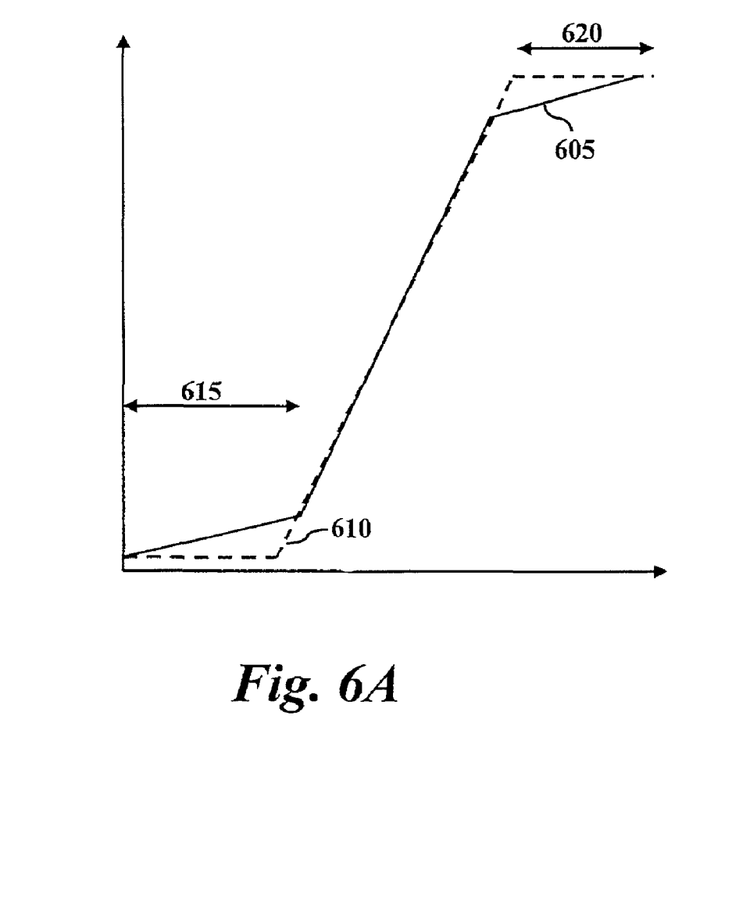
FIGS. 6A and 6B depict graphical representations of curve modification according to one embodiment of the invention.
Figure 6B:
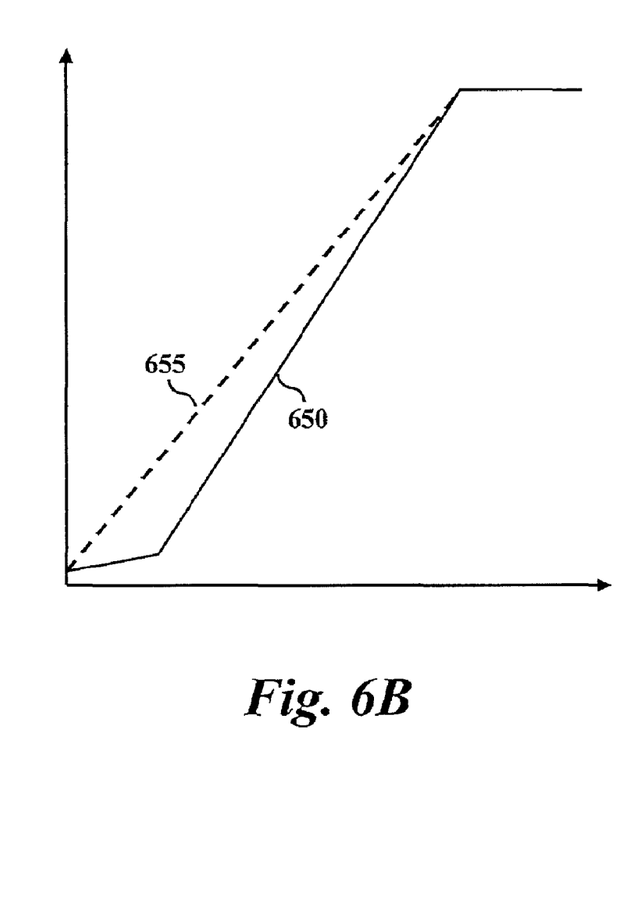

FIG. 4 additionally depicts pixels which may be stretched according to another embodiment of the invention. As will be described in more detail below with respect to FIG. 6, luminance values of pixels 418 may be modified in order to maintain image characteristics in dark regions of the image. It should also be appreciated that pixels in a bright region of the image may also be stretched.

Figure 5A:
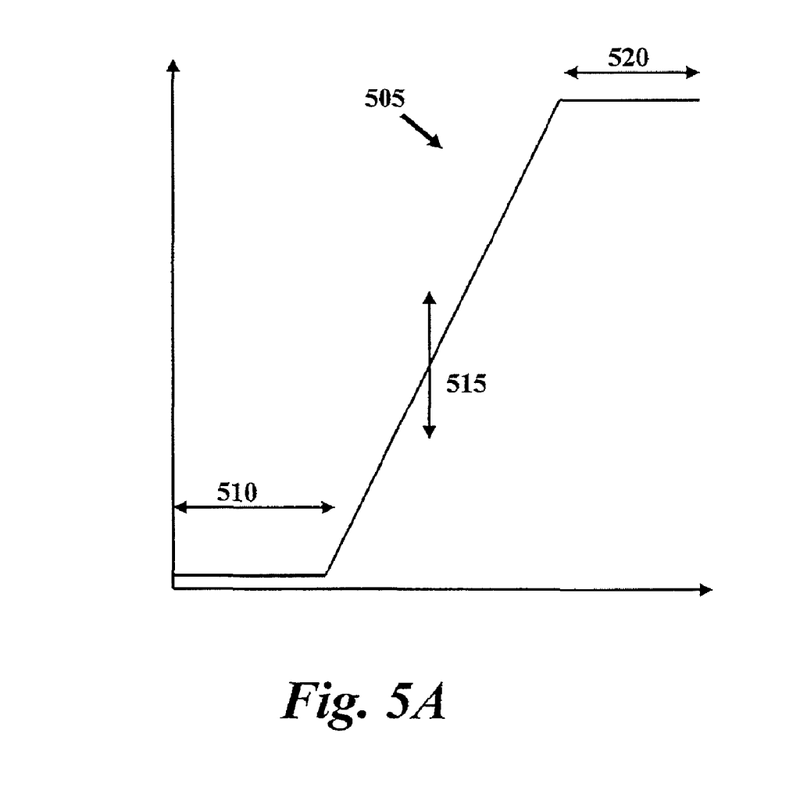
FIGS. 5A and 5B depict graphical representations of look-up table curves according to one embodiment of the invention.
Figure 5B:
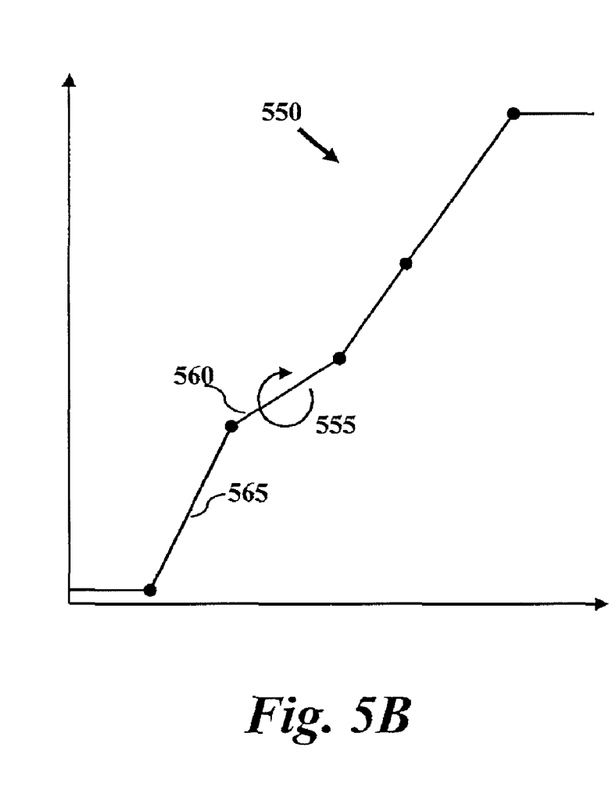

Referring now to FIGS. 5A and 5B, representations are depicted of LUT curves according to one embodiment of the invention. LUT curves 505 and 550 may relate to a histogram calculated by a processor of the adaptive contrast device of FIG. 1. As described above, LUT curves may be used for conversion of pixel values of a frame. The processor may be configured to change image brightness values by shifting and/or adjusting values of a LUT curve as shown in FIG. 5A. By way of example, adaptive contrast may include rotating and/or changing slope of LUT curve 505 in directions 510 and 520. Similarly, adaptive contrast may include shifting of LUT curve 505 in direction 515. As such, adjustment of image brightness based on an APL for the frame may be provided to increase a perceived dynamic range of a displayed image. Similarly, shifts in dark areas 510 and bright areas 520 may provide additional headroom to represent very dark or very bright images. According to another embodiment, the adaptive contrast device may be configured to adjust the slope of a LUT curve as shown in FIG. 5B. By adjusting slope 555 of section 560 of LUT curve 550, a perceived dynamic range of a representative part of a displayed image may be increased. Slope 560 may be determined by both the APL and pixel distribution (e.g., the amount of empty bins after shifting the LUT curve based on APL). According to another embodiment, the processor may be configured to perform a rough adjustment of LUT curve 550 to improve utilization of the adaptive range of output by changing contrast of the image. For example, the rough adjustment may modify slope 560 or any other slope of LUT curve 550 based on a detected APL. According to a further embodiment, the processor may adjust the slope separately for upper and lower regions of the LUT curve 550 based on the APL and ALA determined for a pixel distribution. For example, a contrast adjustment coefficient of a lower part of the curve CSTRETCH_LO and contrast adjustment coefficient of upper part of the curve CSTRETCH_HI are defined using the following equations:

$$C_{STRETCH\_LO} = 1 + K_{C\_STRETCH} * \left[ \min\left( \frac{APL}{APL - MIN}, MAX_{C\_STRETCH} \right) - 1 \right];$$

$$C_{STRETCH\_HI} = 1 + K_{C\_STRETCH} * \left[ \min\left( \frac{255 - APL - ALA}{MAX - APL - ALA}, MAX_{C\_STRETCH} \right) - 1 \right];$$

where:
KC_STRETCH=[0, 1], where 0 corresponds to no contrast adjustment,
MAXC_STRETCH=[1, 2], where 1 corresponds to no stretching. Settings from 1.2 to 1.6 are recommended.

In order to avoid any artifact that is generated by the significant slope change in the LUT curve, the difference of slopes of upper and lower regions of the LUT curve may be limited such that the difference between the higher and lower slopes is below a predefined value.

According to another embodiment, pixels in a dark region and bright region of LUT curve 550 may be stretched to compensate for pixels that may be cutoff. Because utilization of an entire range may be too aggressive to provide reasonable results and can result in fluctuations and/or flickering of dark areas and/or objects, stretching of the pixels may be based on the smaller of a predefined value (e.g., constant between the value of 2-2.5) and a predefined fraction of a calculated stretch factor. For example, stretch calculation for a dark area 565 may be determined by:

$$D_{STRETCH} = \min\left( MAX_{D\_STRECTH}, 1 + K_{D\_STRETCH} * \left[ \frac{LUT(\text{floor}((APL + ALA/2 + MIN))}{LUT(\text{floor}((APL + ALA)/2 + MIN)) - MIN} - 1 \right] \right);$$

where:
MAXD_STRETCH=[1, 3], where 1 corresponds to no stretching. Settings within the range of [1.5, 2.5] are recommended.
KD_STRETCH=[0, 1], where 0 corresponds to clipping all data below APL/2 level, and 1 corresponds to stretching data to occupy all available data range. Settings of KD_STRETCH=0.2-0.6 are recommended.

MIN is the smallest luminance number considered in the luminance histogram.

According to another embodiment, LUT curve extension may be performed in dark and bright areas (e.g., tails) to preserve image details. Referring now to FIGS. 6A and 6B, graphical representations of curve extension are shown according to one or more embodiments of the invention.

Referring first to FIG. 6A, LUT curve 605 may be determined based on LUT curve 610. As shown, LUT curve 605 includes dark region 615 and bright region 620. The slope of LUT curve 605 may be adjusted by the processor to preserve image data in regions 615 and 620. As a result, a perceived dynamic range of image data may be improved. According to one embodiment, the slope of LUT curve 605 in regions 615 and 620 may relate to small value slopes to allow for clipping reduction and/or compensation of cutoff pixels. Once a slope of the LUT curve has been determined, as described in FIG. 5B for example, the slope of regions 615 and 620 may then be adjusted.

The slope of LUT curve 605 in dark region 615 may be based on a determined stretch calculation. It should also be appreciated that a similar calculation may be performed by the processor to determine the slope of LUT curve 605 in bright region 620. Curve extensions may be provided by determining values of LUT curve 605 for pixel regions in the pixel distribution that do not include pixels (e.g., pixel regions 311 and 313). In that fashion, image details may be preserved by providing a fixed low slope LUT curve in dark region 615 and bright region 620.

Referring now to FIG. 6B, LUT 650 is the result of dark level compression of LUT 655. Dark levels of LUT 655 may be compressed to avoid noise amplification in the dark area. As such, curve extension may allow for more efficient processing of image data. As a result, the dynamic range of image data may be compressed.

Figure 7:
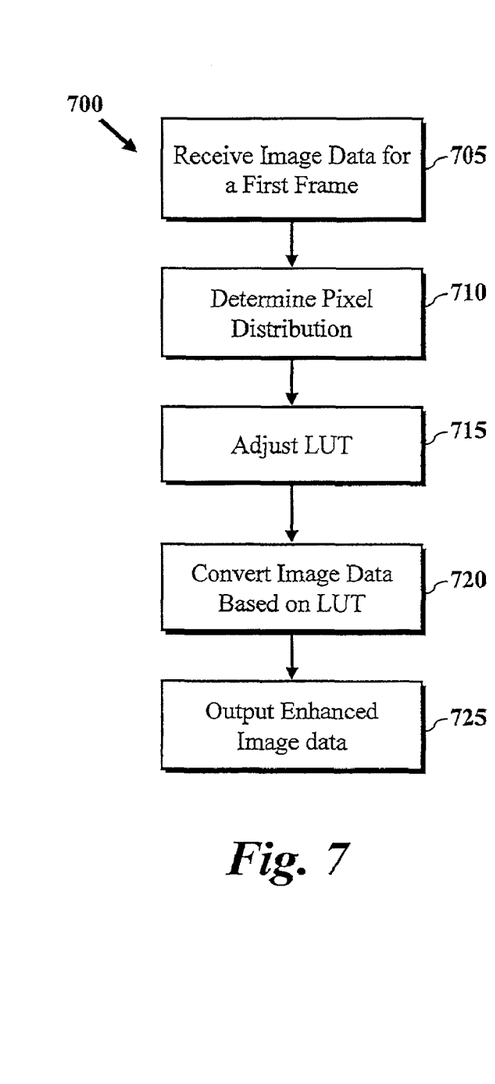
FIG. 7 depicts a process for adaptive contrast of image data according to one or more embodiments of the invention.

Referring now to FIG. 7, a process is depicted for adaptive contrast of image data according to one or more embodiments of the invention. According to one embodiment, process 700 may be performed by an adaptive contrast device as disclosed herein. Process 700 may be initiated by receiving image data of a first frame at block 705. Image data may relate to quarter video graphics array (QVGA), encoded image and/or movie data (e.g., YUV422) and compressed images (e.g., Y-only downscaled copies). Pixel distribution (e.g., pixel distribution 305) may then be determined by the processor at block 710. The processor can determine a pixel distribution for at least one color space component of the first frame based on luminance values in the at least one color space of the pixels. It may also be appreciated that pixel distributions may be determined for additional color spaces of the image data. At block 715, the processor can adjust a LUT based on the pixel distribution. For example, in one embodiment, the processor can calculate an average pixel level of the pixels in the at least one color space based on the pixel distribution to determine an ALA for shifting of the pixel distribution. According to another embodiment, the processor may be configured to adjust a LUT curve by curve extension and/or slope adjustment to modify the LUT. As such, process 700 may increase the dynamic range of the representative parts of the image. Process 700 continues with converting the image data based on the LUT at block 720. Conversion of the data may be based on mapping luminance intensities within each color space to a luminance intensity based on corresponding values in the LUT. At block 725, the enhanced image is output. Process 700 may be repeated for additional color spaces and/or frames. According to one embodiment, adaptive contrast processing and output may be performed at frequencies to output image data in, or substantially in, real time.

Figure 8:
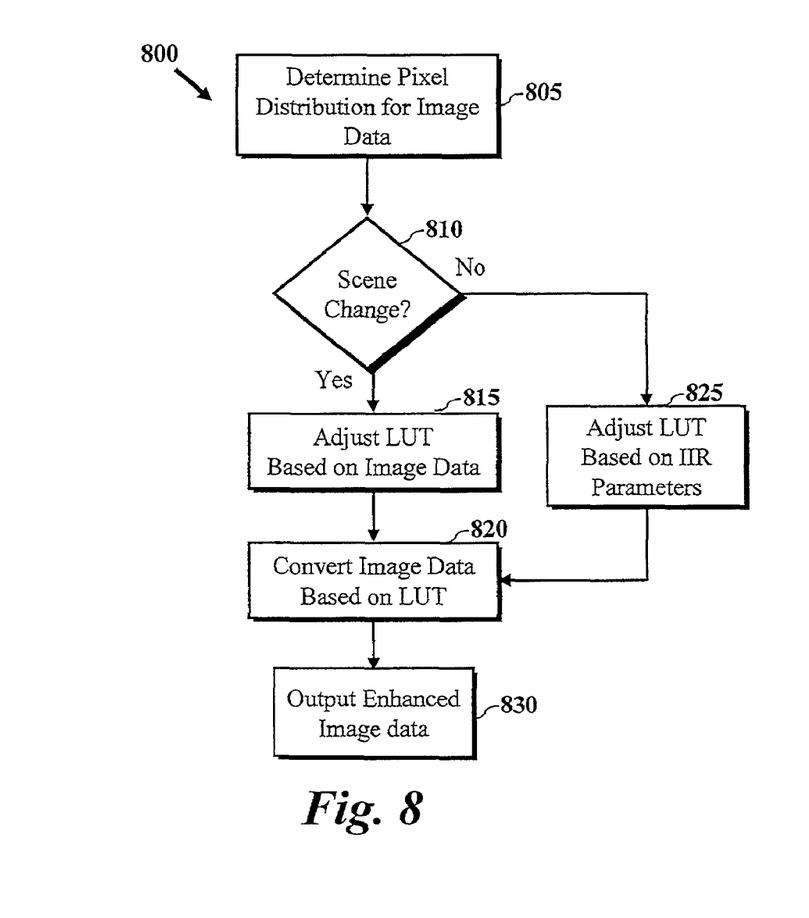
FIG. 8 depicts a process for scene detection with adaptive contrast enhancement according to another embodiment of the invention.

Referring now to FIG. 8, a process is depicted scene detection according to another embodiment of the invention. A scene change may be detected for image data based on a comparison of pixel data for the image data. For example, a scene change may be detected based on a correlation of pixel distributions for two consecutive frames. Scene changes may relate to changes in bright and/or dark levels of image data, such as consecutive frames, which require changes in the LUT to provide an enhanced dynamic range. Process 800 begins at block 805 by determining a pixel distribution for image data. Process 800 proceeds to block 810 to determine if a scene change is determined.

In one embodiment, a scene change may be determined using a Pearson correlation between the pixel distribution of a current frame and previous frame. In an exemplary embodiment the Pearson correlation may be implemented as follows to determine a correlation coefficient C:

$$C = \frac{\frac{\sum_{i=0}^{15} Hg_{curr}(i) * Hg_{prev}(i)}{16} - \frac{\sum_{i=0}^{15} Hg_{curr}(i)}{16} \times \frac{\sum_{i=0}^{15} Hg_{prev}(i)}{16}}{\sqrt{\frac{\sum_{i=0}^{15} Hg_{curr}(i)^2}{16} - \left(\frac{\sum_{i=0}^{15} Hg_{curr}(i)}{16}\right)^2} \times \sqrt{\frac{\sum_{i=0}^{15} Hg_{prev}(i)^2}{16} - \left(\frac{\sum_{i=0}^{15} Hg_{prev}(i)}{16}\right)^2}}$$

The correlation coefficient (C) can indicate the linear dependency of two random variables (e.g., parameters for modification of the LUT) and is normalized between −1 to 1. When the two variables have increasing linear dependency the correlation coefficient will be close to 1. When the two variables have decreasing linear dependency the correlation coefficient will be close to −1. When the correlation coefficient is close to 0, the two variables are independent.

A correlation coefficient for pixel distributions of two adjacent frames may be determined to detect a scene change. When a scene change does not occur, the pixel distributions of the adjacent frame will remain similar resulting in a correlation coefficient close to 1. Alternatively, large changes in the pixel distribution with result in a correlation coefficient having a number much smaller than 1. One advantage of using a correlation coefficient for scene change detection instead of checking a difference between individual parameters may be to avoid sudden jumps of certain parameters due to local distribution changes that do not reflect an entire scene change.

The scene change factor (SC) may be determined as follows:

$$SC = 1 - (C+1)/2$$

SC may range from 0 to 1 and large SC values indicate scene change.

When a scene change is determined (e.g., "YES" path out of decision block 810) the process adjusts the LUT at block 815 based on image data. The image data may then be converted based on modified LUT values at block 820 and enhanced image data based on the modified LUT may be output at block 830. As such, the LUT may be adjusted based on parameters calculated within the frame.

When a scene change is not determined (e.g., "NO" path out of decision block 810) the LUT may be adjusted based on parameters for modification of the LUT, such as IIR filtered parameters (e.g., filtered ALA, $C_{stretch}$, $D_{stretch}$, $B_{stretch}$, etc.) at block 825. Adjustment of the LUT at block 825 can avoid sudden changes to the LUT. The image data may then be converted based on LUT values which may be associated with one or more previous frames and IIR filtered parameters at block 820 and output at block 830. When the SC value is larger than a threshold value $SC_{THRESH}$, parameters of the IIR filter may be reset.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for adaptive contrast enhancement of image data, the method comprising the acts of:
    receiving image data for a first frame;
    determining, in a processor, a pixel distribution for at least one color space component of the first frame based on luminance values of the pixels in the at least one color space component;
    calculating, in the processor, an average picture level in the at least one color space component based on the pixel distribution;
    adjusting, in the processor, a look-up table (LUT) associated with the pixel distribution based on the average picture level;
    converting, in the processor, the luminance values of the pixels in the first frame in the at least one color space component based on the LUT to generate an enhanced image frame; and
    outputting the enhanced image frame to a display device.

2. The method of claim 1, wherein the pixel distribution is calculated for each color space component of the image data.

3. The method of claim 1, wherein adjusting the LUT comprises modifying a LUT curve based on at least one of the average picture level and a midpoint of the pixel distribution.

4. The method of claim 1, further comprising removing upper and lower values of the pixel distribution for calculation of at least one of the average picture level and a midpoint of the pixel distribution.

5. The method of claim 1, further comprising extending a LUT curve in at least one of a bright region and dark region of the pixel distribution.

6. The method of claim 1, further comprising detecting a scene change based on a comparison of the pixel distribution of the first frame with a pixel distribution of a second frame.

7. The method of claim 6, wherein the comparison is a Pearson correlation.

8. A device configured for adaptive contrast enhancement of image data, the device comprising:
    at least one input terminal configured to receive image data for a first frame; and
    a processor coupled to the input terminal, the processor configured to:
    determine a pixel distribution for at least one color space component of the first frame based on luminance values in the at least one color space component;
    extend a look-up table (LUT) curve in at least one of a bright region and dark region of the pixel distribution;
    adjust a LUT associated with the pixel distribution based on the extended LUT curve;
    convert the luminance values of the pixels in the first frame in the at least one color space component based on the adjusted LUT to generate an enhanced image frame; and
    output the enhanced image frame.

9. The device of claim 8, wherein the pixel distribution is calculated for each color space component of the image data.

10. The device of claim 8, wherein the processor is further configured to adjust the LUT by modifying the LUT curve based on at least one of an average picture level and a midpoint of the pixel distribution.

11. The device of claim 8, wherein the processor is further configured to remove upper and lower values of the pixel distribution for calculation of at least one of an average picture level and a midpoint of the pixel distribution.

12. The device of claim 8, wherein the processor is further configured to calculate an average picture level in the at least one color space component based on the pixel distribution.

13. The device of claim 8, wherein the processor is further configured to detect a scene change based on a comparison of the pixel distribution of the first frame with a pixel distribution of a second frame.

14. The device of claim 13, wherein the comparison is a Pearson correlation.

15. A device configured for adaptive contrast enhancement of image data, the device comprising:
    at least one input terminal configured to receive image data for a first frame; and
    a processor coupled to the input terminal, the processor configured to:
    determine a first pixel distribution for at least one color space component of the first frame based on luminance values of pixels in the at least one color space component;
    convert luminance values of the pixels in the first frame in the at least one color space component based on a look-up table (LUT) to generate an enhanced image frame;
    output the enhanced image frame;
    determine a second pixel distribution for the at least one color space component of a second frame based on luminance values of pixels in the at least one color space component;
    detect a scene change based on a comparison of the first and second pixel distributions; and
    update the LUT based on a detected scene change.

16. The device of claim 15, wherein the first and second pixel distributions are calculated for each color space component of the first and second image frames.

17. The device of claim 15, wherein the comparison is a Pearson correlation.

18. The device of claim 15, wherein the processor is further configured to remove upper and lower values of the first pixel distribution for calculation of at least one of an average picture level and a midpoint of said pixel distribution.

19. The device of claim 15, wherein the processor is further configured to extend a LUT curve in at least one of a bright region and dark region of the first pixel distribution.

20. A device configured for adaptive contrast enhancement of image data, the device comprising:
    at least one input terminal configured to receive image data for a first frame; and
    a processor coupled to the input terminal, the processor configured to:
    determine a pixel distribution for at least one color space component of the first frame based on luminance values of the pixels in the at least one color space;

calculate an average picture level in the at least one color space based on the pixel distribution;

adjust a look-up table (LUT) associated with the pixel distribution based on the average picture level;

convert the luminance values of the pixels in the first frame in the at least one color space based on the LUT to generate an enhanced image frame; and output the enhanced image frame.

21. The device of claim 20, wherein the pixel distribution is calculated for each color space component of the image data.

22. The device of claim 20, wherein the processor is further configured to adjust the LUT by modifying a LUT curve based on at least one of the average picture level and a midpoint of the pixel distribution.

23. The device of claim 20, wherein the processor is further configured to remove upper and lower values of the pixel distribution for calculation of at least one of the average picture level and a midpoint of the pixel distribution.

24. The device of claim 20, wherein the processor is further configured to extend a LUT curve in at least one of a bright region and dark region of the pixel distribution.

25. The device of claim 20, wherein the processor is further configured to detect a scene change based on a comparison of the pixel distribution of the first distribution with a pixel distribution of a second frame.

26. The device of claim 25, wherein the comparison is a Pearson correlation.

* * * * *